(12) United States Patent
Oku et al.

(10) Patent No.: US 11,143,337 B2
(45) Date of Patent: Oct. 12, 2021

(54) THREADED CONNECTION FOR STEEL PIPE

(71) Applicants: Nippon Steel Corporation, Tokyo (JP); Vallourec Oil and Gas France, Aulnoye-Aymeries (FR)

(72) Inventors: Yousuke Oku, Tokyo (JP); Masaaki Sugino, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 0 days.

(21) Appl. No.: 16/647,215

(22) PCT Filed: Nov. 6, 2018

(86) PCT No.: PCT/JP2018/041148
§ 371 (c)(1),
(2) Date: Mar. 13, 2020

(87) PCT Pub. No.: WO2019/093311
PCT Pub. Date: May 16, 2019

(65) Prior Publication Data
US 2020/0278056 A1 Sep. 3, 2020

(30) Foreign Application Priority Data

Nov. 9, 2017 (JP) .............................. JP2017-216690

(51) Int. Cl.
*F16L 15/00* (2006.01)

(52) U.S. Cl.
CPC ................................. *F16L 15/007* (2013.01)

(58) Field of Classification Search
CPC ..... F16L 15/004; F16L 15/009; F16L 15/001; F16L 15/006

(Continued)

(56) References Cited

U.S. PATENT DOCUMENTS 2,992,019 A * 7/1961 Macarthur .......... E21B 17/0423
285/334
3,870,351 A * 3/1975 Matsuki ................ F16L 15/004
285/334

(Continued)

FOREIGN PATENT DOCUMENTS

CA 2961189 A1 * 4/2016 ............ F16L 15/002
JP 2006-526747 A 11/2006

(Continued)

OTHER PUBLICATIONS

English Abstract & Family List of JP2006526747A.

(Continued)

*Primary Examiner* — David Bochna
(74) *Attorney, Agent, or Firm* — Banner & Witcoff, Ltd.

(57) ABSTRACT

A threaded connection for steel pipe with improved sealability against the internal and external pressures is provided. A threaded connection 1 includes a pin 10 and a box 20. The pin 10 includes a male thread 11, a nose 12, a pin shoulder surface 13, and a pin sealing surface 14. The box 20 includes a female thread 21, a box shoulder surface 23, and a box sealing surface 24. The box sealing surface 24 has a seal point SP on the taper surface 242 located at the midpoint thereof as determined along the direction of the pipe axis CL. The distance $L_{SP}$ between the tip of the nose 12 and the seal point SP as measured in the direction of pipe axis CL is 13 mm or larger. The shoulder angle α between the pin or box shoulder surface 13 or 23 and a plane VP perpendicular to the pipe axis CL is 2 to 13 degrees. The ratio $T_B/T_P$ of the wall thickness $T_B$ of the box to the wall thickness $T_P$ of the pin 10 as measured at the seal point SP is 1.7 or higher.

2 Claims, 9 Drawing Sheets

(58) Field of Classification Search
USPC .................................................. 285/333, 334
See application file for complete search history.

(56) References Cited

U.S. PATENT DOCUMENTS

| | | | | |
|---|---|---|---|---|
| 5,029,906 A | * | 7/1991 | Chelette | .................. F16L 15/04 285/113 |
| 5,066,052 A | * | 11/1991 | Read | ..................... F16L 15/004 285/334 |
| 5,338,074 A | * | 8/1994 | Barringer | .............. F16L 15/004 285/334 |
| 5,964,486 A | * | 10/1999 | Sinclair | ................. F16L 15/004 285/331 |
| 2004/0262919 A1 | * | 12/2004 | Dutilleul | ................. F16L 15/00 285/333 |
| 2011/0025051 A1 | * | 2/2011 | Yamaguchi | ........... F16L 15/004 285/333 |
| 2011/0241340 A1 | * | 10/2011 | Okada | ................... F16L 15/004 285/333 |
| 2013/0181442 A1 | * | 7/2013 | Sonobe | ................. F16L 15/004 285/333 |
| 2015/0240570 A1 | * | 8/2015 | Oku | ....................... F16L 15/002 285/334 |

FOREIGN PATENT DOCUMENTS

| | | |
|---|---|---|
| JP | 2012506000 A | 3/2012 |
| JP | 2012247028 A | 12/2012 |
| JP | 2013029176 A | 2/2013 |
| JP | 2014013052 A | 1/2014 |

OTHER PUBLICATIONS

English Abstract & Family List of JP2013029176A.
English Abstract & Family List of JP2014013052A.
English Abstract & Family List of JP2012247028A.

* cited by examiner

THREADED CONNECTION FOR STEEL PIPE

RELATED APPLICATION DATA

This application is a National Stage Application under 35 U.S.C. 371 of co-pending PCT application number PCT/JP2018/041148 designating the United States and filed Nov. 6, 2018; which claims the benefit of JP application number 2017-216690 and filed Nov. 9, 2017 each of which are hereby incorporated by reference in their entireties.

TECHNICAL FIELD

The present disclosure relates to a threaded connection for steel pipes.

BACKGROUND ART

Steel pipes called oil-well pipes are used, for example, for prospecting or producing oil or natural gas in oil wells or natural-gas wells (hereinafter collectively referred to as "oil wells" or the like), developing non-conventional resources such as oil sand or shale gas, retrieving or storing carbon dioxide (Carbon dioxide Capture and Storage (CCS)), for geothermal power generation, or in hot springs. A threaded connection is used to connect oil-well pipes.

Such threaded connections for steel pipes are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, a male thread of a steel pipe is screwed into a female thread of the coupling such that they are made up and connected. An integral connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and thus are tubular in shape.

An oil well is drilled along while its side wall is reinforced by oil-well pipes to prevent the side wall from collapsing during digging, which results in multiple oil-well pipes arranged in one another. In recent years, both on-land and offshore oil wells have become deeper and deeper; in such environments, to connect oil-well pipes, threaded connections in which the inner and outer diameters of the connection portions are generally equal to, or slightly larger than, the inner and outer diameters of the steel pipes are often used, in order to improve efficiency in developing oil wells. The use of such threaded connections minimizes the gaps between the oil-well pipes arranged in one another, which improves efficiency in developing a deep oil well without significantly increasing the diameter of the well. A threaded connection is required to have good sealability against pressure fluid from the inside (hereinafter also referred to as "internal pressure") and pressure fluid from the outside (hereinafter also referred to as "external pressure") under the above-described restrictions as to the inner and outer diameters. Further, if oil-well pipes are used in an oil well with great depth, for example, thermal expansion of a pipe may apply large tensile loads or compressive loads to the associated threaded connection. In such environments, too, a threaded connection is required to have good sealability.

A known threaded connection that can ensure sealability is a threaded connection provided with a seal using metal-to-metal contact (hereinafter referred to as "metal seal"). A metal seal is an arrangement in which the diameter of the sealing surface of the pin is slightly larger than the diameter of the sealing surface of the box (this difference in diameter will be referred to as "interference") such that, when the threaded connection is made up and the sealing surfaces fit together, the interference causes a reduction in the diameter of the sealing surface of the pin and causes an increase in the diameter of the sealing surface of the box, and each of the sealing surfaces tries to recover their original diameters and thus produces elastic recovery forces, which produce contact pressures on the sealing surfaces to cause them to adhere to each other along the entire periphery, thereby providing sealability.

JP 2006-526747 A (Patent Document 1) discloses a threaded connection for steel pipe composed of a pin and a box. The pin includes a male thread, a sealing surface, and a shoulder surface. Correspondingly, the box includes a female thread, a sealing surface, and a shoulder surface. The pin includes a nose located between the sealing surface and shoulder surface. The nose is not in contact with the corresponding portion of the box. This document teaches that the shoulder angle is preferably 4 to 16 degrees relative to a plane perpendicular to the pipe axis.

JP 2013-29176 A (Patent Document 2) discloses a threaded connection for steel pipe composed of a pin and a box. The pin includes a male thread, a nose extending from the male thread toward the pipe end, and a shoulder provided on the tip of the nose. The box includes a female thread to be screwably connected to the male thread to form a thread assembly, a sealing surface facing the outer periphery of the nose of the pin, and a shoulder abutting the shoulder of the pin. The outer periphery of the nose of the pin is shaped to be a curved surface protruding toward the outside. The sealing surface of the box is shaped to be a single taper. The outer periphery of the nose of the pin and the sealing surface of the box come into metal-to-metal contact such that the contact portions form a seal.

JP 2014-13052 A (Patent Document 3) discloses a threaded connection for pipe composed of a pin member and a box member. The pin member includes a male thread, a nose extending from the male thread toward the pipe end, and a shoulder provided on the tip of the nose. The box member includes a female thread to be screwably connected to the male thread, an inner periphery facing the outer periphery of the nose of the pin member, and a shoulder abutting the shoulder of the pin member. The outer periphery of the pin nose is a curved, protruding surface. The inner periphery of the box member is a taper surface adapted to interfere with the curved protruding surface of the pin nose when the box member is connected to the pin member. The shoulder angle of the shoulder is 0 degree or larger. As a result of screwably connecting the pin and box members, the members are connected such that the protruding curved surface of the pin nose and the taper surface of the box member come into metal-to-metal contact, where the contact interface forms a seal.

The following documents are incorporated herein by reference.

[Patent Document 1] JP 2006-526747 A
[Patent Document 2] JP 2013-29176 A
[Patent Document 3] JP 2014-13052 A

SUMMARY OF THE DISCLOSURE

An object of the present disclosure is to provide a threaded connection for steel pipe with improved sealability against the internal and external pressures.

The present inventors did extended research on factors affecting the sealability against the internal and external pressures other than shoulder angle, and newly found that the distance between the tip of the pin and the metal seal affects the sealability. In addition to this finding, the present inventors newly found that the wall-thickness ratio between the pin and box as measured at the metal seal, which had not been taken into consideration, affects the sealability. Based on these new findings, the present inventors invented the threaded connection described below.

The threaded connection for steel pipe according to the present disclosure includes: a tubular pin formed from a tip portion of the steel pipe; and a tubular box adapted to be made up on the pin as the pin is inserted therein. The pin includes: a male thread provided on an outer periphery of the pin; a nose formed from a tip portion of the pin, the nose having an outer diameter smaller than an inner diameter of a portion of the box that faces the nose when the pin and the box have been made up; a pin shoulder surface provided on a tip of the nose; and a pin sealing surface provided on the outer periphery of the pin, the pin sealing surface located between the male thread and the nose. The pin sealing surface includes a first curvature surface, a second curvature surface and a first taper surface, the first curvature surface being located closer to the pin shoulder surface than the second curvature surface is, the second curvature surface being located more distant from the pin shoulder surface than the first curvature surface is, the first taper surface being located between the first curvature surface and the second curvature surface. The box includes: a female thread provided on an inner periphery of the box, the female thread corresponding to the male thread; a box shoulder surface facing the pin shoulder surface, the box shoulder surface being in contact with the pin shoulder surface when the pin and the box have been made up; and a box sealing surface facing the pin sealing surface, the box sealing surface being in contact with the pin sealing surface when the pin and the box have been made up. The box sealing surface includes a third curvature surface, a fourth curvature surface and a second taper surface, the third curvature surface being located closer to the box shoulder surface than the fourth curvature surface is, the fourth curvature surface being located more distant from the box shoulder surface than the third curvature surface is, the second taper surface being located between the third curvature surface and the fourth curvature surface. The box sealing surface has a seal point on the second taper surface located at a midpoint as determined along a direction of a pipe axis. A seal-point distance between the tip of the nose and the seal point as measured in the direction of the pipe axis is 13 mm or higher. A shoulder angle between the pin shoulder surface or the box shoulder surface and a plane perpendicular to the pipe axis is 2 to 13 degrees. A seal wall-thickness ratio of a wall thickness of the box to a wall thickness of the pin as measured at the seal point is 1.7 or higher. The seal-point distance may be 13 to 25 mm. The shoulder angle may be 2 to 10 degrees. The seal wall-thickness ratio may be 1.8 to 3.0.

EMBODIMENTS FOR CARRYING OUT THE INVENTION

Figure 1:
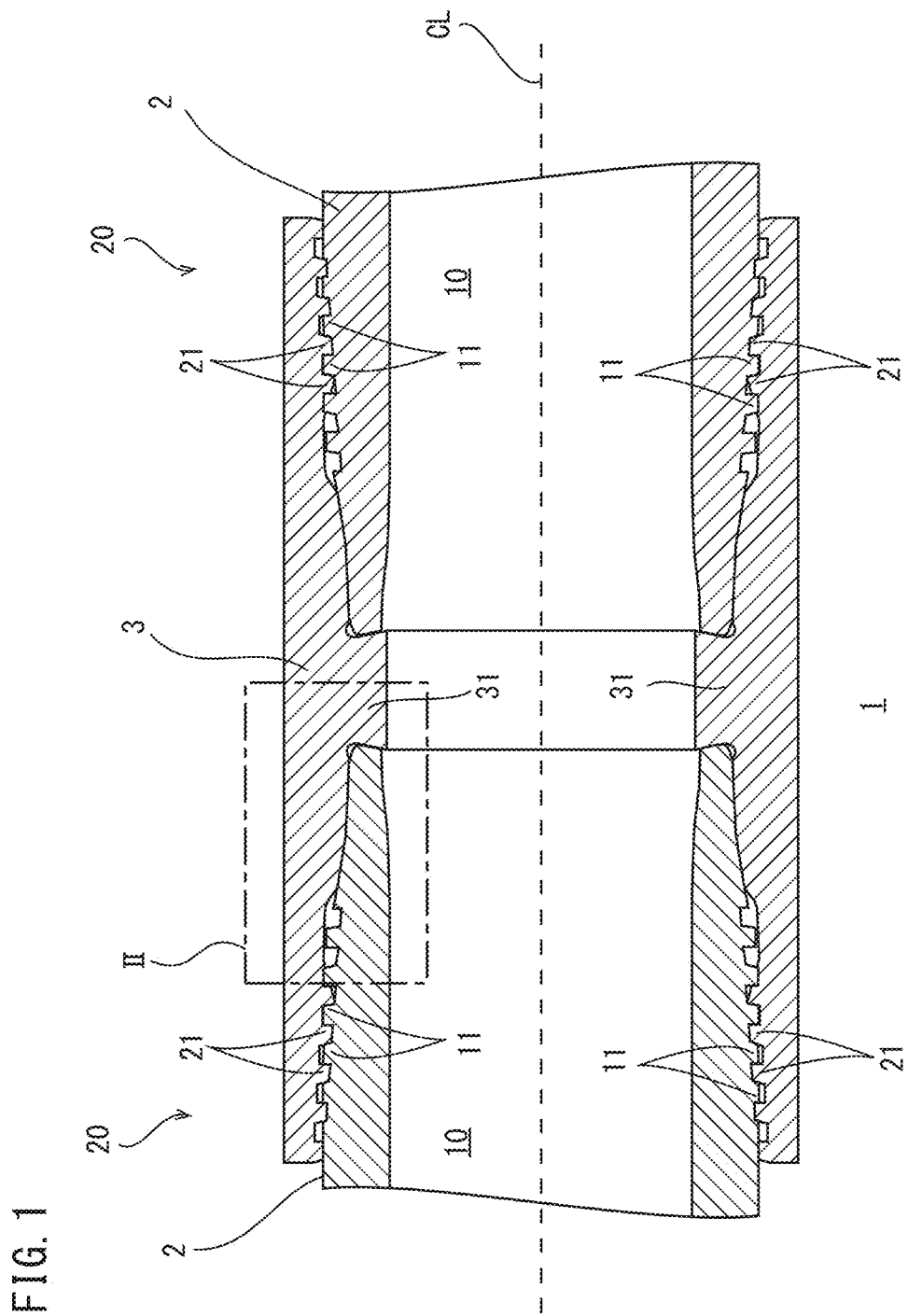
FIG. 1 is a longitudinal cross-sectional view of a coupling-type threaded connection for steel pipe according to an embodiment, along the pipe-axis direction.

The threaded connection for steel pipe according to an embodiment will now be described with reference to the drawings. The same and corresponding elements in the drawings are labeled with the same characters, and the same details will not be repeated.

Referring to FIG. 1, the threaded connection for steel pipe 1 according to the present embodiment includes tubular pins 10 and a tubular box 20. Each pin 10 is formed from a portion of a steel pipe 2 associated with one tip. The box 20 is made up on the pin 10 as the pin 10 is inserted therein. The portions of the steel pipe 2 other than the tip portions may be hereinafter specifically referred to as "steel-pipe body".

The threaded connection 1 shown in FIG. 1 is a coupling-type one that includes two pins 10 and a coupling 3. One pin 10 is formed from a tip portion of one steel pipe 2. The other pin 10 is formed from a tip portion of the other steel pipe 2. The coupling 3 includes two boxes 20 and an annular protruding portion 31. The one box 20 is formed from a portion of the coupling 3 associated with one coupling end. The other box 20 is formed from a portion of the coupling 3 associated with the other coupling end. The protruding portion 31 is provided in the middle of the coupling 3. The one box 20 is made up on the one pin 10 as the one pin 10 is inserted therein. The other box 20 is provided on the side of the coupling opposite to the one box 20, and is made up on the other pin 10 as the other pin 10 is inserted therein.

Figure 2:
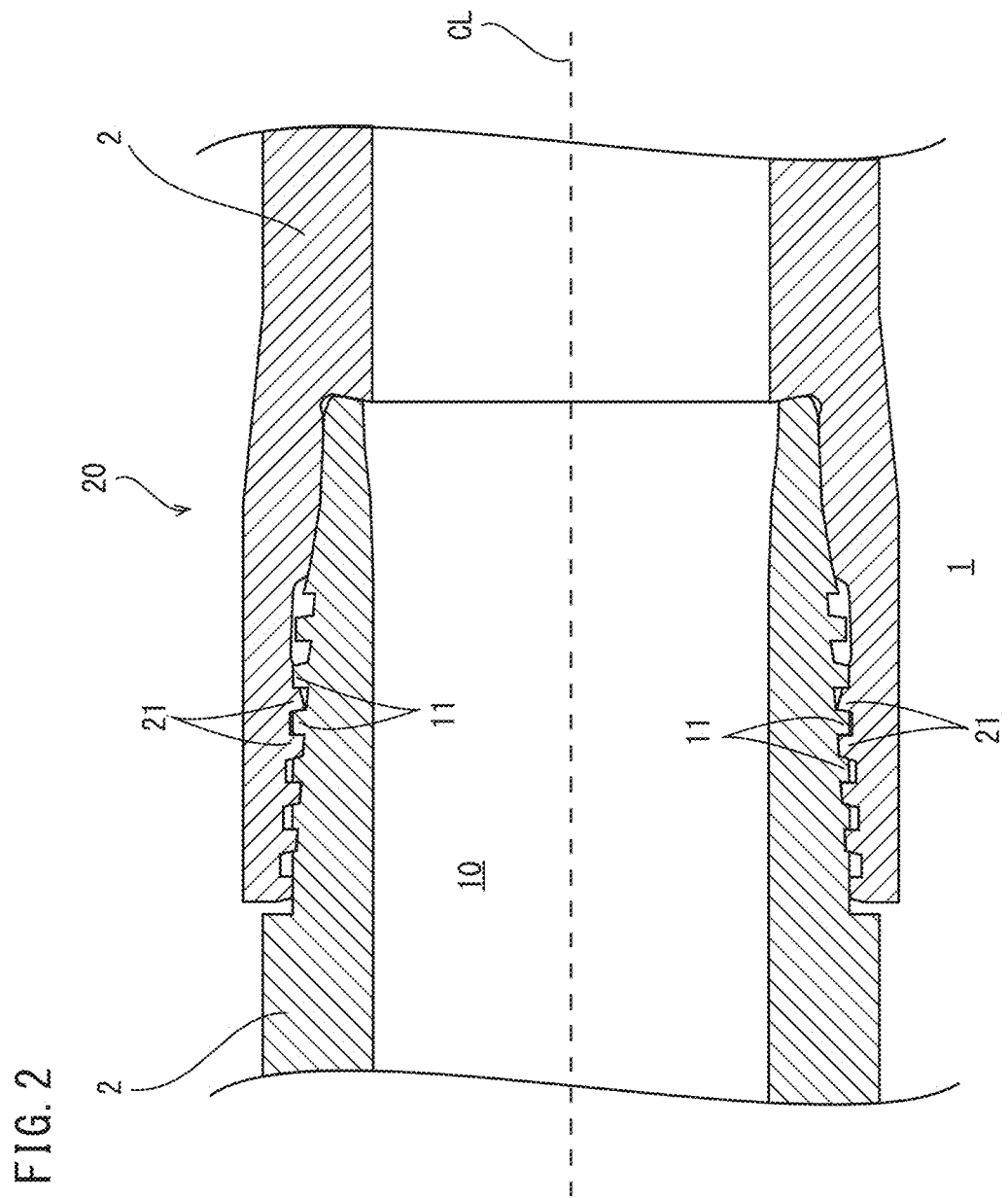
FIG. 2 is a longitudinal cross-sectional view of an integral threaded connection for steel pipe, different from that of FIG. 1, along the pipe-axis direction.

Alternatively, the threaded connection 1 may be an integral one. As shown in FIG. 2, the integral threaded connection 1 is configured to connect two steel pipes 2, and includes a pin 10 and a box 20. In the integral threaded connection 1, one steel pipe 2 includes a pin 10 and the other steel pipe 2 includes a box 20.

Figure 3:
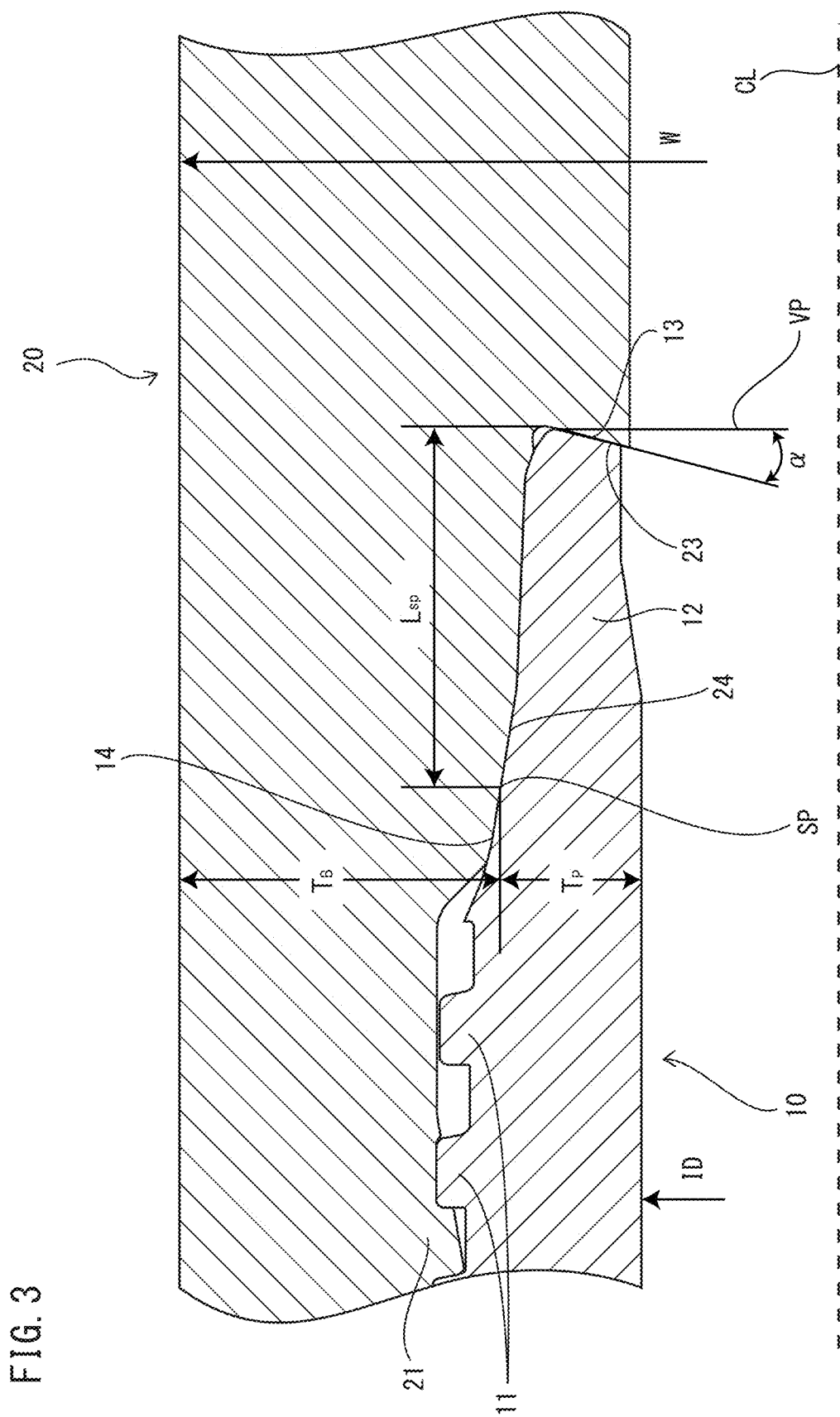
FIG. 3 is an enlarged longitudinal cross-sectional view of portion II in FIG. 1.
Figure 4:
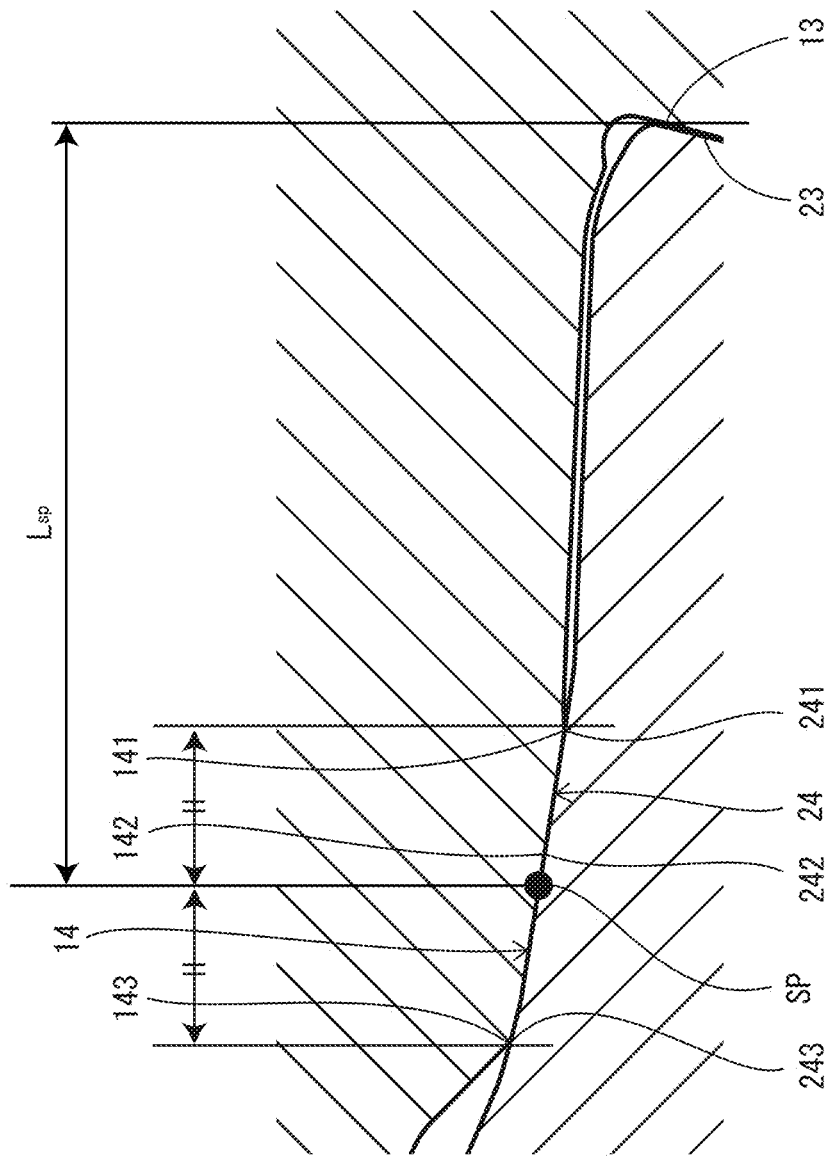
FIG. 4 is an enlarged longitudinal cross-sectional view of the seal and nose and surrounding portions in FIG. 3.

Referring to FIGS. 1 and 3, the pin 10 includes a male thread 11, a nose 12, a pin shoulder surface 13, and a pin sealing surface 14. The male thread 11 is provided on the outer periphery of the pin 10. The nose 12 is formed from a tip portion of the pin 10, and has an outer diameter that is smaller than the inner diameter of the portion of the box 20 that faces the nose when the pin 10 and box 20 have been made up. As such, a small clearance is formed between the outer periphery of the nose 12 of the pin 10 and the opposite inner periphery of the box 20, as shown in FIG. 4. The pin shoulder surface 13 is provided on the tip of the nose 12. The pin sealing surface 14 is provided on the outer periphery of the pin 10, located between the male thread 11 and nose 12.

The pin sealing surface 14 includes a curvature surface 141, a curvature surface 143 and a taper surface 142, the curvature surface 141 being located closer to the pin shoulder surface 13 than the curvature surface 143 is, the curvature surface 143 being located more distant from the pin shoulder surface 13 than the curvature surface 141 is, the taper surface 142 being located between the curvature surfaces 141 and 143. That is, the pin sealing surface 14 is composed of the curvature surface 141, taper surface 142 and curvature surface 143. The curvature surface 141, taper surface 142 and curvature surface 143 are arranged in this order along the direction of the pipe axis CL.

The box 20 includes a female thread 21, a box shoulder surface 23 and a box sealing surface 24. The female thread 21 is provided on the inner periphery of the box 20 to correspond to the male thread 11. The box shoulder surface 23 faces the pin shoulder surface 13, and is in contact with the pin shoulder surface 13 when the pin 10 and box 20 have been made up. The box sealing surface 24, facing the pin sealing surface 14, is in contact with the pin sealing surface 14 when the pin 10 and box 20 have been made up, and is tapered in shape.

The box sealing surface 24 includes a curvature surface 241, a curvature surface 243 and a taper surface 242, the curvature surface 241 being located closer to the box shoulder surface 23 than the curvature surface 243 is, the curvature surface 243 being located more distant from the box shoulder surface 23 than the curvature surface 241 is, the taper surface 242 being located between the curvature surfaces 241 and 243. That is, the box sealing surface 24 is composed of the curvature surface 241, taper surface 242 and curvature surface 243. The curvature surface 241, taper surface 242 and curvature surface 243 are arranged in this order along the direction of the pipe axis CL.

The male and female threads 11 and 21 are trapezoidal threads that can be obtained by modifying the shape of buttress threads.

Referring to FIGS. 3 and 4, the box sealing surface 24 has a seal point SP. The seal point SP is on the taper surface 242 of the box sealing surface 24 and is located at the midpoint of the box sealing surface 24 as determined along the direction of the pipe axis CL. A seal-point distance, $L_{SP}$, is not smaller than 13 mm. The seal-point distance $L_{SP}$ is the distance between the tip of the nose 12 and the seal point SP as determined along the direction of pipe axis CL. A shoulder angle, $\alpha$, is 2 to 13 degrees. The shoulder angle $\alpha$ is the angle between the pin or box shoulder surface 13 or 23 and a plane VP perpendicular to the pipe axis CL. A seal wall-thickness ratio, $T_B/T_P$, is not lower than 1.7. The seal wall-thickness ratio $T_B/T_P$, measured at the seal point SP, is the ratio of the wall thickness of the box 20 (hereinafter referred to as "box-seal wall thickness") $T_B$ to the wall thickness of the pin 10 (hereinafter referred to as "pin-seal wall thickness") $T_P$. In FIG. 3, W denotes the outer diameter of the box 20, while ID denotes the inner diameter of the pipe body 2.

With this configuration in place, the lower limit of the seal-point distance $L_{SP}$ is preferably 14 mm, and more preferably 15 mm. If the seal-point distance $L_{SP}$ is too large, this reduces manufacturability; to prevent this, the upper limit of the seal-point distance $L_{SP}$ may be 25 mm, for example, but preferably 24 mm, and more preferably 23 mm. The lower limit of the shoulder angle $\alpha$ is preferably 3 degrees, and more preferably 4 degrees. The upper limit of the shoulder angle $\alpha$ is preferably 10 degrees, and more preferably 9 degrees. The lower limit of the seal wall-thickness ratio $T_B/T_P$ is preferably 1.8, and more preferably 1.9. In implementations where multiple steel pipes are arranged in one another and inserted into a well, a coupling 3 with an excessively large outer diameter may interfere with the inner periphery of a pin 10 located outside; to prevent this, the upper limit of the seal wall-thickness ratio $T_B/T_P$ may be 3.0, for example, but preferably 2.9, and more preferably 2.8.

In the above-illustrated embodiment, the seal-point distance $L_{SP}$ is not smaller than 13 mm, which means high rigidity of the nose 12; as such, when a compressive load is applied to the threaded connection 1, the nose 12 bears some of the compressive load to prevent the sealing surface of the metal seal from deflecting, thereby minimizing the reduction in the contact pressure. In addition, the seal wall-thickness ratio $T_B/T_P$ is not lower than 1.7, which means high rigidity of the box 20; as such, the box 20 has a particularly high resistance against an upthrust from an internal pressure, thereby maintaining the adhesion between the sealing surfaces, thus minimizing the reduction in the contact pressure of the metal seal. As a result, an improved sealability against internal and external pressures is provided.

Although an embodiment has been described, the present invention is not limited to the above-illustrated embodiment, and various modifications are possible without departing from the spirit of the invention.

EXAMPLES

To verity the effects of the present embodiment, torque performance and sealability were evaluated using the finite element method (FEM). Buttress-threaded connections were evaluated, where steel pipes as described below were used.

Size: 7 inches, 26# (with a pipe-body outer diameter of 177.8 mm and a pipe-body inner diameter of 159.41 mm)

Material: Oil-well pipe material L80 according to API standards (with a nominal proof strength YS of 552 MPa (80 ksi))

Tables 1 and 2 show dimensions of 42 experiment examples that were analyzed, and evaluation results thereof. In these examples, the outer diameter of the pipe body 2, the inner diameter ID of the pipe body 2, the outer diameter W of the box 20, the pin-seal wall thickness $T_P$, the box-seal wall thickness $T_B$, and the seal wall-thickness ratio $T_B/T_P$ were constant, and the seal-point (SP) distance $L_{SP}$ and shoulder angle $\alpha$ were varied. Table 1 shows results sorted according to the seal-point distance $L_{SP}$ and shows values of yield torque as evaluation results for torque performance. Table 2 shows results sorted according to the shoulder angle $\alpha$ and shows values of minimum seal contact force as evaluation results for sealability. The definitions of yield torque and minimum seal contact force will be provided further below. The shoulder angle $\alpha$ of the pin 10 was equal to the shoulder angle $\alpha$ of the box.

TABLE 1

| Mark | Pipe-body outer diameter [mm] | Pipe-body inner diameter [mm] | Box outer diameter [mm] | Pin-seal wall thickness [mm] | Box-seal wall thickness [mm] | Seal wall-thickness ratio | SP distance [mm] | Shoulder angle [deg] | Yield torque [ft-lbs] |
|---|---|---|---|---|---|---|---|---|---|
| 1 | 177.8 | 159.41 | 192.85 | 5.7225 | 11.3125 | 2 | 8 | 0 | 9427 |
| 2 | 177.8 | 159.41 | 192.85 | 5.7225 | 11.3125 | 2 | 8 | 3 | 9724 |
| 3 | 177.8 | 159.41 | 192.85 | 5.7225 | 11.3125 | 2 | 8 | 5 | 9897 |
| 4 | 177.8 | 159.41 | 192.85 | 5.7225 | 11.3125 | 2 | 8 | 15 | 9618 |
| 5 | 177.8 | 159.41 | 192.85 | 5.7225 | 11.3125 | 2 | 8 | 25 | 8893 |
| 6 | 177.8 | 159.41 | 192.85 | 5.7225 | 11.3125 | 2 | 8 | 35 | 8499 |
| 7 | 177.8 | 159.41 | 192.85 | 5.7225 | 11.3125 | 2 | 9 | 0 | 9509 |
| 8 | 177.8 | 159.41 | 192.85 | 5.7225 | 11.3125 | 2 | 9 | 3 | 9806 |
| 9 | 177.8 | 159.41 | 192.85 | 5.7225 | 11.3125 | 2 | 9 | 5 | 9860 |
| 10 | 177.8 | 159.41 | 192.85 | 5.7225 | 11.3125 | 2 | 9 | 15 | 9583 |
| 11 | 177.8 | 159.41 | 192.85 | 5.7225 | 11.3125 | 2 | 9 | 25 | 9151 |
| 12 | 177.8 | 159.41 | 192.85 | 5.7225 | 11.3125 | 2 | 9 | 35 | 9220 |
| 13 | 177.8 | 159.41 | 192.85 | 5.7225 | 11.3125 | 2 | 10 | 0 | 9611 |
| 14 | 177.8 | 159.41 | 192.85 | 5.7225 | 11.3125 | 2 | 10 | 3 | 9920 |
| 15 | 177.8 | 159.41 | 192.85 | 5.7225 | 11.3125 | 2 | 10 | 5 | 9944 |
| 16 | 177.8 | 159.41 | 192.85 | 5.7225 | 11.3125 | 2 | 10 | 15 | 9552 |
| 17 | 177.8 | 159.41 | 192.85 | 5.7225 | 11.3125 | 2 | 10 | 25 | 9441 |
| 18 | 177.8 | 159.41 | 192.85 | 5.7225 | 11.3125 | 2 | 10 | 35 | 9055 |
| 19 | 177.8 | 159.41 | 192.85 | 5.7225 | 11.3125 | 2 | 11 | 0 | 9690 |
| 20 | 177.8 | 159.41 | 192.85 | 5.7225 | 11.3125 | 2 | 11 | 3 | 9989 |
| 21 | 177.8 | 159.41 | 192.85 | 5.7225 | 11.3125 | 2 | 11 | 5 | 10078 |
| 22 | 177.8 | 159.41 | 192.85 | 5.7225 | 11.3125 | 2 | 11 | 15 | 10030 |
| 23 | 177.8 | 159.41 | 192.85 | 5.7225 | 11.3125 | 2 | 11 | 25 | 9620 |
| 24 | 177.8 | 159.41 | 192.85 | 5.7225 | 11.3125 | 2 | 11 | 35 | 9123 |
| 25 | 177.8 | 159.41 | 192.85 | 5.7225 | 11.3125 | 2 | 12 | 0 | 9774 |
| 26 | 177.8 | 159.41 | 192.85 | 5.7225 | 11.3125 | 2 | 12 | 3 | 10081 |
| 27 | 177.8 | 159.41 | 192.85 | 5.7225 | 11.3125 | 2 | 12 | 5 | 10140 |
| 28 | 177.8 | 159.41 | 192.85 | 5.7225 | 11.3125 | 2 | 12 | 15 | 9866 |
| 29 | 177.8 | 159.41 | 192.85 | 5.7225 | 11.3125 | 2 | 12 | 25 | 9666 |
| 30 | 177.8 | 159.41 | 192.85 | 5.7225 | 11.3125 | 2 | 12 | 35 | 9269 |
| 31 | 177.8 | 159.41 | 192.85 | 5.7225 | 11.3125 | 2 | 13 | 0 | 9853 |
| 32 | 177.8 | 159.41 | 192.85 | 5.7225 | 11.3125 | 2 | 13 | 3 | 10154 |
| 33 | 177.8 | 159.41 | 192.85 | 5.7225 | 11.3125 | 2 | 13 | 5 | 10181 |
| 34 | 177.8 | 159.41 | 192.85 | 5.7225 | 11.3125 | 2 | 13 | 15 | 10080 |
| 35 | 177.8 | 159.41 | 192.85 | 5.7225 | 11.3125 | 2 | 13 | 25 | 9717 |
| 36 | 177.8 | 159.41 | 192.85 | 5.7225 | 11.3125 | 2 | 13 | 35 | 9133 |
| 37 | 177.8 | 159.41 | 192.85 | 5.7225 | 11.3125 | 2 | 18 | 0 | 10220 |
| 38 | 177.8 | 159.41 | 192.85 | 5.7225 | 11.3125 | 2 | 18 | 3 | 10434 |
| 39 | 177.8 | 159.41 | 192.85 | 5.7225 | 11.3125 | 2 | 18 | 5 | 10634 |
| 40 | 177.8 | 159.41 | 192.85 | 5.7225 | 11.3125 | 2 | 18 | 15 | 10327 |
| 41 | 177.8 | 159.41 | 192.85 | 5.7225 | 11.3125 | 2 | 18 | 25 | 10031 |
| 42 | 177.8 | 159.41 | 192.85 | 5.7225 | 11.3125 | 2 | 18 | 35 | 9514 |

TABLE 2

| Mark | Pipe-body outer diameter [mm] | Pipe-body inner diameter [mm] | Box outer diameter [mm] | Pin-seal wall thickness [mm] | Box-seal wall thickness [mm] | Seal wall-thickness ratio | Shoulder angle [deg] | SP distance [mm] | Minimum seal contact force [N/mm] |
|---|---|---|---|---|---|---|---|---|---|
| 1 | 177.8 | 159.41 | 192.85 | 5.7225 | 11.3125 | 2 | 0 | 8 | 261 |
| 7 | 177.8 | 159.41 | 192.85 | 5.7225 | 11.3125 | 2 | 0 | 9 | 284 |
| 13 | 177.8 | 159.41 | 192.85 | 5.7225 | 11.3125 | 2 | 0 | 10 | 311 |
| 19 | 177.8 | 159.41 | 192.85 | 5.7225 | 11.3125 | 2 | 0 | 11 | 332 |
| 25 | 177.8 | 159.41 | 192.85 | 5.7225 | 11.3125 | 2 | 0 | 12 | 358 |
| 31 | 177.8 | 159.41 | 192.85 | 5.7225 | 11.3125 | 2 | 0 | 13 | 378 |
| 37 | 177.8 | 159.41 | 192.85 | 5.7225 | 11.3125 | 2 | 0 | 18 | 422 |
| 2 | 177.8 | 159.41 | 192.85 | 5.7225 | 11.3125 | 2 | 3 | 8 | 270 |
| 8 | 177.8 | 159.41 | 192.85 | 5.7225 | 11.3125 | 2 | 3 | 9 | 300 |
| 14 | 177.8 | 159.41 | 192.85 | 5.7225 | 11.3125 | 2 | 3 | 10 | 325 |
| 20 | 177.8 | 159.41 | 192.85 | 5.7225 | 11.3125 | 2 | 3 | 11 | 352 |
| 26 | 177.8 | 159.41 | 192.85 | 5.7225 | 11.3125 | 2 | 3 | 12 | 373 |
| 32 | 177.8 | 159.41 | 192.85 | 5.7225 | 11.3125 | 2 | 3 | 13 | 395 |
| 38 | 177.8 | 159.41 | 192.85 | 5.7225 | 11.3125 | 2 | 3 | 18 | 410 |
| 3 | 177.8 | 159.41 | 192.85 | 5.7225 | 11.3125 | 2 | 5 | 8 | 278 |
| 9 | 177.8 | 159.41 | 192.85 | 5.7225 | 11.3125 | 2 | 5 | 9 | 309 |
| 15 | 177.8 | 159.41 | 192.85 | 5.7225 | 11.3125 | 2 | 5 | 10 | 331 |
| 21 | 177.8 | 159.41 | 192.85 | 5.7225 | 11.3125 | 2 | 5 | 11 | 354 |

TABLE 2-continued

| Mark | Pipe-body outer diameter [mm] | Pipe-body inner diameter [mm] | Box outer diameter [mm] | Pin-seal wall thickness [mm] | Box-seal wall thickness [mm] | Seal wall-thickness ratio | Shoulder angle [deg] | SP distance [mm] | Minimum seal contact force [N/mm] |
|---|---|---|---|---|---|---|---|---|---|
| 27 | 177.8 | 159.41 | 192.85 | 5.7225 | 11.3125 | 2 | 5 | 12 | 378 |
| 33 | 177.8 | 159.41 | 192.85 | 5.7225 | 11.3125 | 2 | 5 | 13 | 373 |
| 39 | 177.8 | 159.41 | 192.85 | 5.7225 | 11.3125 | 2 | 5 | 18 | 402 |
| 4 | 177.8 | 159.41 | 192.85 | 5.7225 | 11.3125 | 2 | 15 | 8 | 285 |
| 10 | 177.8 | 159.41 | 192.85 | 5.7225 | 11.3125 | 2 | 15 | 9 | 309 |
| 16 | 177.8 | 159.41 | 192.85 | 5.7225 | 11.3125 | 2 | 15 | 10 | 337 |
| 22 | 177.8 | 159.41 | 192.85 | 5.7225 | 11.3125 | 2 | 15 | 11 | 341 |
| 28 | 177.8 | 159.41 | 192.85 | 5.7225 | 11.3125 | 2 | 15 | 12 | 328 |
| 34 | 177.8 | 159.41 | 192.85 | 5.7225 | 11.3125 | 2 | 15 | 13 | 337 |
| 40 | 177.8 | 159.41 | 192.85 | 5.7225 | 11.3125 | 2 | 15 | 18 | 396 |
| 5 | 177.8 | 159.41 | 192.85 | 5.7225 | 11.3125 | 2 | 25 | 8 | 274 |
| 11 | 177.8 | 159.41 | 192.85 | 5.7225 | 11.3125 | 2 | 25 | 9 | 302 |
| 17 | 177.8 | 159.41 | 192.85 | 5.7225 | 11.3125 | 2 | 25 | 10 | 332 |
| 23 | 177.8 | 159.41 | 192.85 | 5.7225 | 11.3125 | 2 | 25 | 11 | 332 |
| 29 | 177.8 | 159.41 | 192.85 | 5.7225 | 11.3125 | 2 | 25 | 12 | 341 |
| 35 | 177.8 | 159.41 | 192.85 | 5.7225 | 11.3125 | 2 | 25 | 13 | 348 |
| 41 | 177.8 | 159.41 | 192.85 | 5.7225 | 11.3125 | 2 | 25 | 18 | 405 |
| 6 | 177.8 | 159.41 | 192.85 | 5.7225 | 11.3125 | 2 | 35 | 8 | 264 |
| 12 | 177.8 | 159.41 | 192.85 | 5.7225 | 11.3125 | 2 | 35 | 9 | 295 |
| 18 | 177.8 | 159.41 | 192.85 | 5.7225 | 11.3125 | 2 | 35 | 10 | 324 |
| 24 | 177.8 | 159.41 | 192.85 | 5.7225 | 11.3125 | 2 | 35 | 11 | 340 |
| 30 | 177.8 | 159.41 | 192.85 | 5.7225 | 11.3125 | 2 | 35 | 12 | 363 |
| 36 | 177.8 | 159.41 | 192.85 | 5.7225 | 11.3125 | 2 | 35 | 13 | 368 |
| 42 | 177.8 | 159.41 | 192.85 | 5.7225 | 11.3125 | 2 | 35 | 18 | 418 |

Table 3 shows dimensions of 8 experiment examples that are other than the above examples except for Mark 5 (the same as Mark 33 in Tables 1 and 2) and evaluation results for sealability. In these examples, the outer diameter of the pipe body 2, the inner diameter ID of the pipe body 2, the pin-seal wall thickness $T_P$, the seal-point distance $L_{SP}$ and the shoulder angle α were constant and the outer diameter W of the box 20 and the box-seal wall thickness $T_B$ were varied to vary the seal wall-thickness ratio $T_B/T_P$. The evaluation results for the sealability against external and internal pressures shown are represented by values of minimum seal contact force found when the external and internal pressures were applied.

thickness ratio $T_B/T_P$, the sealabilities against a simple external pressure and a simple internal pressure were also taken into consideration. Only the external pressure or only the internal pressure was gradually increased without applying an axial force, and the minimum seal contact force was evaluated.

Figure 6:
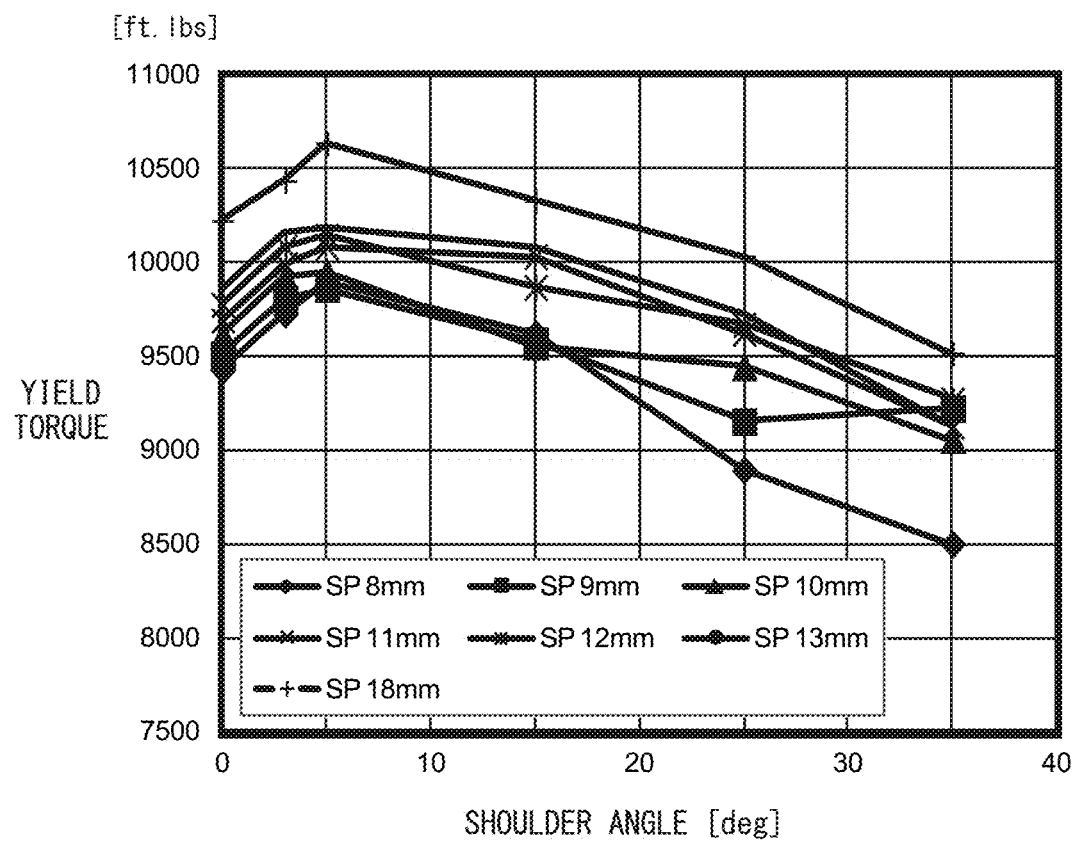
FIG. 6 graphs evaluation results for torque performance.

FIG. 6 graphs the yield torque obtained from the FEM. FIG. 6 reveals that the yield torque depends on the seal-point distance $L_{SP}$ and shoulder angle α. As the seal-point distance $L_{SP}$ increases, stiffness increases, which suggests improvements in torque performance. Meanwhile, when the shoulder angle α is at 5 degrees, yield torque is at the maximum, and, when the shoulder angle α increases from 5 degrees, yield

TABLE 3

| Mark | Pipe-body outer diameter [mm] | Pipe-body inner diameter [mm] | Box outer diameter [mm] | Pin-seal wall thickness [mm] | Box-seal wall thickness [mm] | Seal wall-thickness ratio | SP distance [mm] | Shoulder angle [deg] | Minimum seal contact force (external pressure) [N/mm] | Minimum seal contact force (internal pressure) [N/mm] |
|---|---|---|---|---|---|---|---|---|---|---|
| 1 | 177.8 | 159.41 | 185.1 | 5.7225 | 7.4375 | 1.3 | 13 | 5 | 536 | 597 |
| 2 | 177.8 | 159.41 | 187.39 | 5.7225 | 8.5825 | 1.5 | 13 | 5 | 547 | 770 |
| 3 | 177.8 | 159.41 | 189.68 | 5.7225 | 9.7275 | 1.7 | 13 | 5 | 555 | 862 |
| 4 | 177.8 | 159.41 | 191.97 | 5.7225 | 10.8725 | 1.9 | 13 | 5 | 565 | 882 |
| 5 | 177.8 | 159.41 | 192.85 | 5.7225 | 11.3125 | 2 | 13 | 5 | 568 | 893 |
| 6 | 177.8 | 159.41 | 196.55 | 5.7225 | 13.1625 | 2.3 | 13 | 5 | 572 | 907 |
| 7 | 177.8 | 159.41 | 198.84 | 5.7225 | 14.3075 | 2.5 | 13 | 5 | 573 | 915 |
| 8 | 177.8 | 159.41 | 201.13 | 5.7225 | 15.4525 | 2.7 | 13 | 5 | 575 | 923 |
| 9 | 177.8 | 159.41 | 204.5 | 5.7225 | 17.1375 | 3 | 13 | 5 | 576 | 932 |

Figure 5:
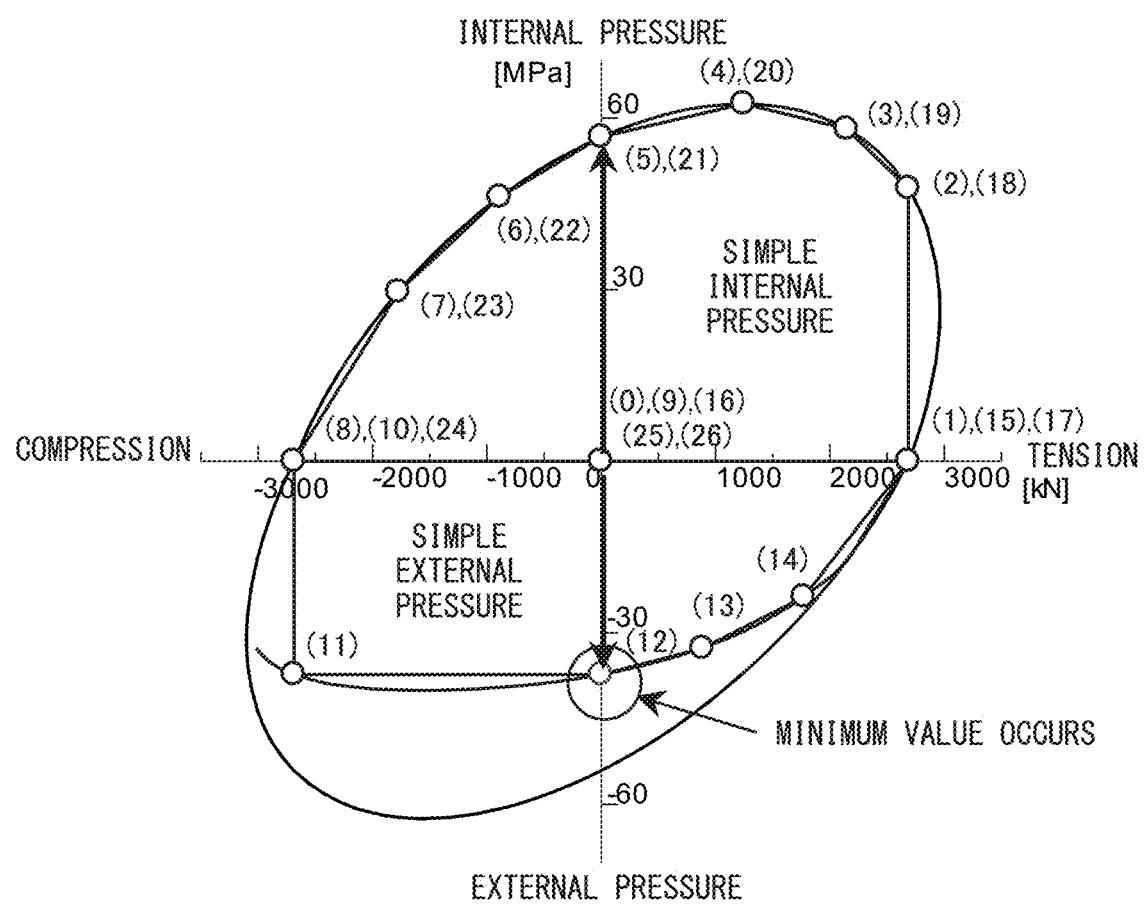
FIG. 5 graphs envelopes for load conditions used in an FEM analysis.

For torque performance, the maximum torque value (MTV), at which the make-up torque line begins to yield, was treated as "yield torque", and this value was used to evaluate torque performance. For sealability, analysis was performed under a complex-load condition simulating the ISO 13679 Series A test established in 2011 shown in FIG. 5, the value of the seal contact force for each load step was determined, and the minimum value was treated as "minimum seal contact force", and this value was used to evaluate sealability. Further, to evaluate the effects of the seal wall-torque decreases. This reveals that, since the torque performance is significantly affected by the shoulder angle α, the shoulder angle α is preferably 2 to 13 degrees.

Figure 7:
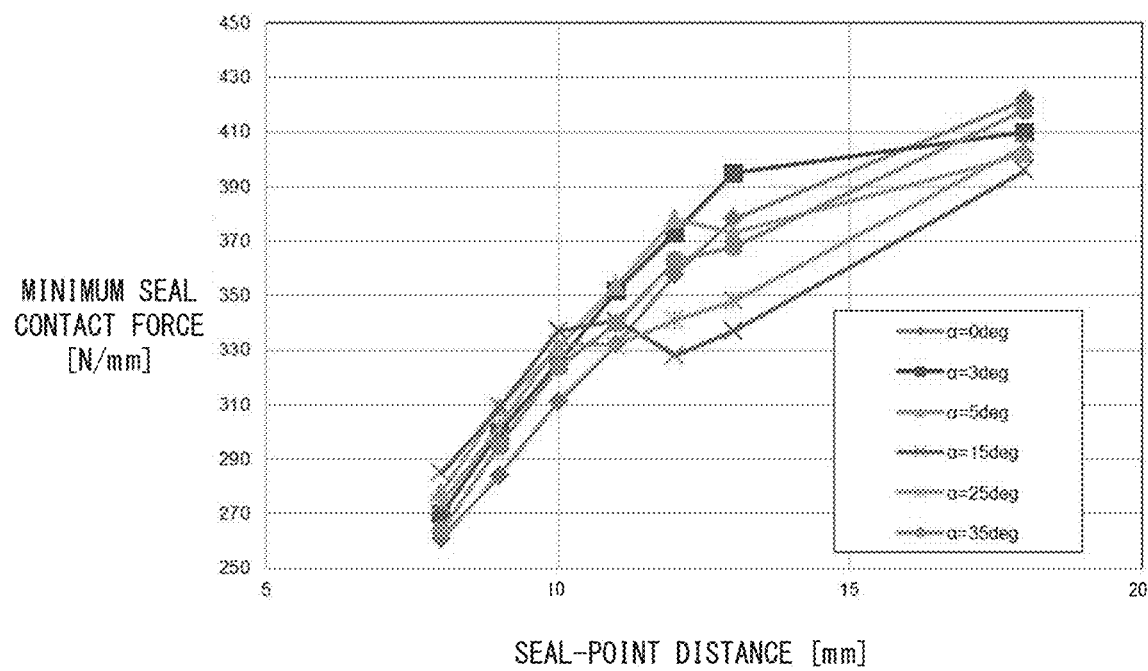
FIG. 7 graphs evaluation results for sealability under complex loads.

FIG. 7 shows evaluation results for sealability under complex loads. The minimum seal contact force occurred under simple external pressure at load step (12) in FIG. 5. FIG. 7 reveals that, when the seal-point distance $L_{SP}$ is 13 mm or more, sealability is improved regardless of the shoulder angle α. These evaluation results reveal that, advantageously, the shoulder angle α is 2 to 13 degrees and the seal-point distance $L_{SP}$ is 13 mm or more to provide both high sealability and high torque performance.

Figure 8:
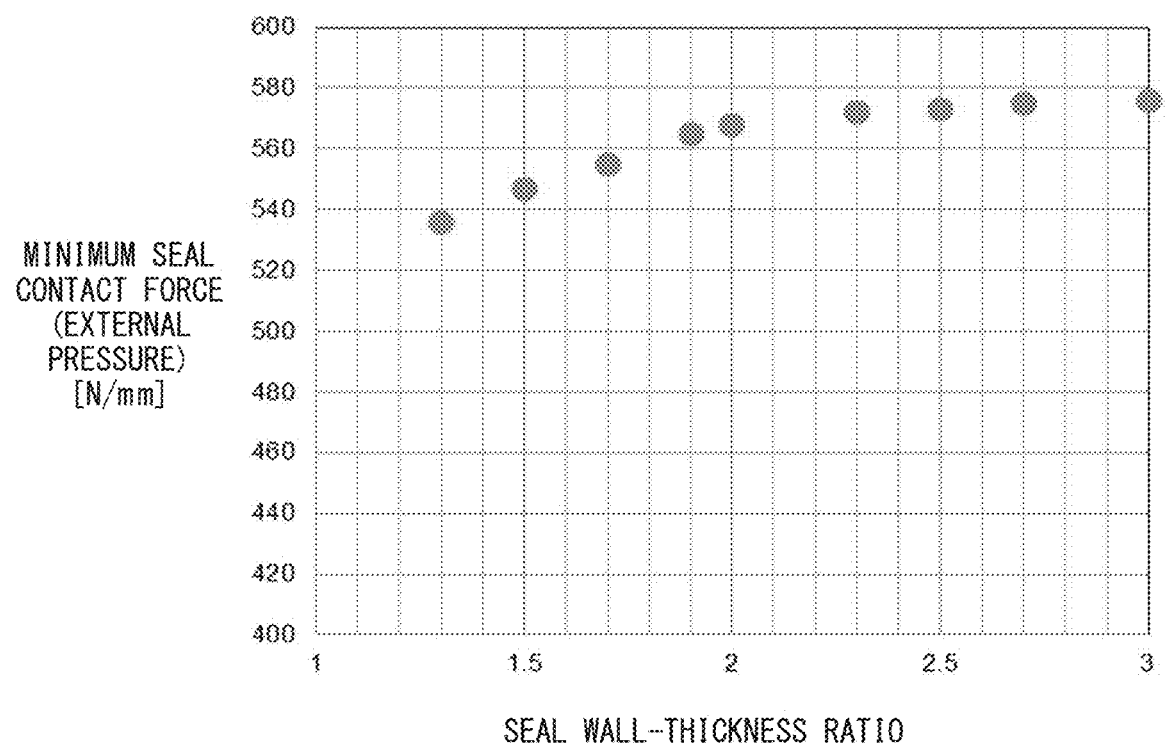
FIG. 8 graphs evaluation results for the sealability against the external pressure.
Figure 9:
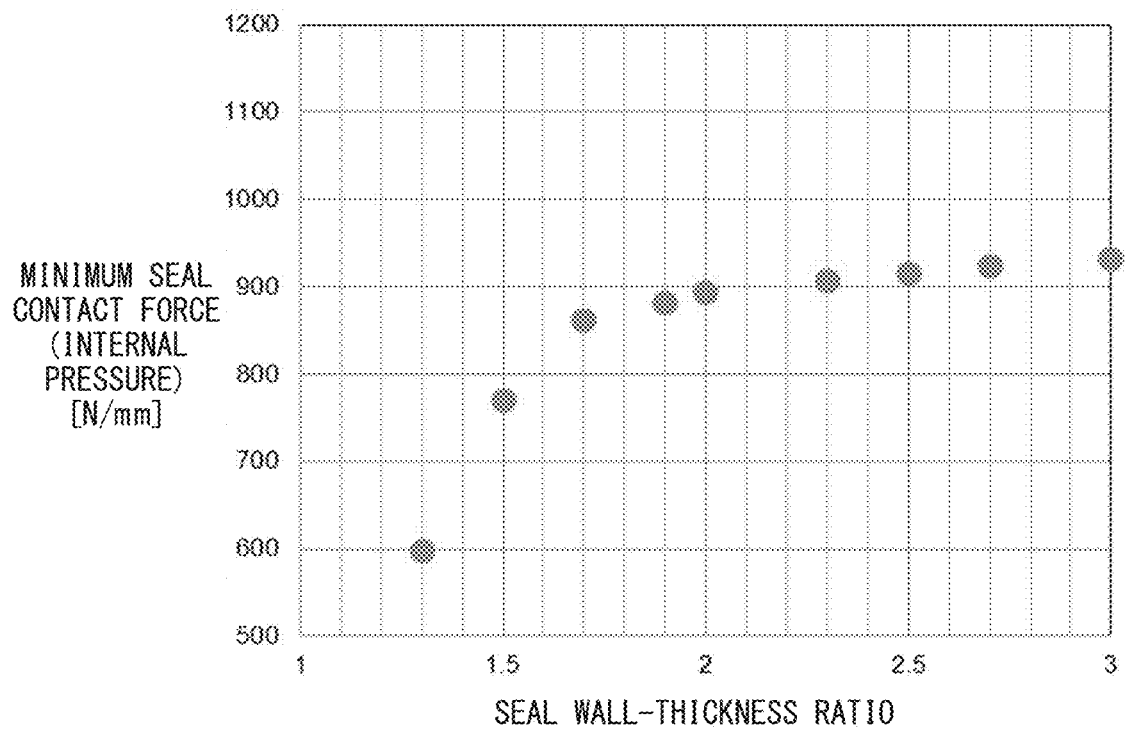
FIG. 9 graphs the evaluation results for the sealability against the internal pressure.

In addition, as shown in Table 3, the shoulder angle α was fixed at 5 degrees and the seal-point distance $L_{SP}$ was fixed at 13 mm, and the seal wall-thickness ratio $T_B/T_P$ was varied. To investigate the effects of the seal wall-thickness ratio $T_B/T_P$ on sealability, sealability was evaluated based on the load envelope across the simple internal and external pressures shown in FIG. 5. FIG. 8 shows evaluation results for sealability under simple external pressure, and FIG. 9 shows evaluation results under simple internal pressure. In both cases, sealability improves as the seal wall-thickness ratio $T_B/T_P$ increases; however, especially FIG. 9 shows that the sealability against the internal pressure is significantly low when the seal wall-thickness ratio $T_B/T_P$ is below 1.7, and saturation is present at 1.7 or above. This reveals that it is desirable that the seal wall-thickness ratio $T_B/T_P$ be 1.7 or higher.

EXPLANATION OF REFERENCES

1: threaded connection
2: steel pipe (steel-pipe body)
3: coupling
10: pin
11: male thread
12: nose
13: pin shoulder surface
14: pin sealing surface
20: box
21: female thread
23: box shoulder surface
24: box sealing surface
141, 143, 241, 243: curvature surfaces
142, 242: taper surfaces
SP: seal point
$L_{SP}$: seal-point distance
α: shoulder angle
$T_B/T_P$: seal wall-thickness ratio
CL: pipe axis

The invention claimed is:

1. A threaded connection for steel pipe, comprising:
a tubular pin formed from a tip portion of the steel pipe; and
a tubular box adapted to be made up on the pin as the pin is inserted therein,
wherein the pin includes:
a male thread provided on an outer periphery of the pin;
a nose formed from a tip portion of the pin, the nose having an outer diameter smaller than an inner diameter of a portion of the box that faces the nose when the pin and the box have been made up;
a pin shoulder surface provided on a tip of the nose; and
a pin sealing surface provided on the outer periphery of the pin, the pin sealing surface located between the male thread and the nose,
the pin sealing surface includes a first curvature surface, a second curvature surface and a first taper surface, the first curvature surface being located closer to the pin shoulder surface than the second curvature surface is, the second curvature surface being located more distant from the pin shoulder surface than the first curvature surface is, the first taper surface being located between the first curvature surface and the second curvature surface,
the box includes:
a female thread provided on an inner periphery of the box, the female thread corresponding to the male thread;
a box shoulder surface facing the pin shoulder surface, the box shoulder surface being in contact with the pin shoulder surface when the pin and the box have been made up; and
a box sealing surface facing the pin sealing surface, the box sealing surface being in contact with the pin sealing surface when the pin and the box have been made up,
the box sealing surface includes a third curvature surface, a fourth curvature surface and a second taper surface, the third curvature surface being located closer to the box shoulder surface than the fourth curvature surface is, the fourth curvature surface being located more distant from the box shoulder surface than the third curvature surface is, the second taper surface being located between the third curvature surface and the fourth curvature surface,
the box sealing surface has a seal point on the second taper surface located at a midpoint as determined along a direction of a pipe axis,
a seal-point distance between the tip of the nose and the seal point as measured in the direction of the pipe axis is 13 mm or more,
a shoulder angle between the pin shoulder surface or the box shoulder surface and a plane perpendicular to the pipe axis is 2 to 13 degrees, and
a seal wall-thickness ratio of a wall thickness of the box to a wall thickness of the pin as measured at the seal point is 1.7 or higher.

2. The threaded connection for steel pipe according to claim 1, wherein:
the seal-point distance is 13 to 25 mm;
the shoulder angle is 2 to 10 degrees; and
the seal wall-thickness ratio is 1.8 to 3.0.

* * * * *